(12) United States Patent
Alaisowi et al.

(10) Patent No.: US 12,212,138 B2
(45) Date of Patent: Jan. 28, 2025

(54) SOLAR POWER DISTRIBUTION AND CONTROL SYSTEM FOR MOVABLE STORAGE CONTAINERS

(71) Applicant: WESTHILL INNOVATION INC., Simcoe (CA)

(72) Inventors: Mohammad Hussein Alaisowi, Mississauga (CA); Vernon Douglas Steven Sherwood, Dundas (CA); Gina Succi, Ancaster (CA)

(73) Assignee: WESTHILL INNOVATION INC., Simcoe (CA)

( * ) Notice: Subject to any disclaimer, the term of this patent is extended or adjusted under 35 U.S.C. 154(b) by 0 days.

(21) Appl. No.: 17/768,183

(22) PCT Filed: Oct. 9, 2020

(86) PCT No.: PCT/IB2020/059529
§ 371 (c)(1),
(2) Date: Apr. 11, 2022

(87) PCT Pub. No.: WO2021/070146
PCT Pub. Date: Apr. 15, 2021

(65) Prior Publication Data
US 2024/0097445 A1 Mar. 21, 2024

Related U.S. Application Data

(60) Provisional application No. 62/913,971, filed on Oct. 11, 2019.

(51) Int. Cl.
*H02S 10/40* (2014.01)
*B65D 88/74* (2006.01)
(Continued)

(52) U.S. Cl.
CPC .............. *H02J 3/06* (2013.01); *B65D 88/745* (2013.01); *H02J 7/35* (2013.01); *H02S 10/40* (2014.12)

(58) Field of Classification Search
CPC ....... H01L 31/00–078; Y02E 10/50–60; H02S 10/40; H02S 20/30; H02S 40/30–38
(Continued)

(56) References Cited

U.S. PATENT DOCUMENTS

| | | | |
|---|---|---|---|
| 10,389,121 B1 * | 8/2019 | Sherry | ...................... H02J 3/02 |
| 2007/0221515 A1 | 9/2007 | Lindley | |

(Continued)

FOREIGN PATENT DOCUMENTS

| | | | |
|---|---|---|---|
| CA | 2974750 A1 | 1/2018 | |
| EP | 2793345 A1 * | 10/2014 | ................ H02J 3/32 |

(Continued)

OTHER PUBLICATIONS

JP-2014007846-A English (Year: 2014).*
(Continued)

*Primary Examiner* — Bach T Dinh
(74) *Attorney, Agent, or Firm* — Perry + Currier Inc.

(57) ABSTRACT

A movable storage container includes: a plurality of walls defining an enclosure for storing items; a solar power generation array affixed to an outer surface of at least one of the walls; an energy storage device configured to receive power from the solar power generation array; a switch assembly configured to: selectively receive power from a source selected from (i) the energy storage device, (ii) an auxiliary generator, and (iii) an electrical grid input, and direct the received power to a refrigeration unit; a polyphase inverter assembly connected between the energy storage (Continued)

device and the switch assembly, and a controller connected with the switch and configured to transmit source selection commands to the switch.

9 Claims, 8 Drawing Sheets

(51) Int. Cl.
*H02J 3/06* (2006.01)
*H02J 7/35* (2006.01)

(58) Field of Classification Search
USPC .................................................. 136/243–265
See application file for complete search history.

(56) References Cited

U.S. PATENT DOCUMENTS

2011/0260533 A1    10/2011   Hardin

2015/0292783 A1    10/2015   Trotter
2018/0106509 A1*    4/2018   Hollingsworth ...... F25D 11/025

FOREIGN PATENT DOCUMENTS

| JP | 2014007846 A | * | 1/2014 |
| KR | 20190004592 A | | 1/2019 |
| WO | WO-2016201396 A1 | | 12/2016 |
| WO | WO-2018009798 A1 | | 1/2018 |
| WO | WO-2019058142 A1 | | 3/2019 |

OTHER PUBLICATIONS

PCT International Search Report, Jan. 11, 2021 re PCT International Patent Application No. PCT/IB2020/059529.
PCT Written Opinion of the International Searching Authority, Jan. 11, 2021 re PCT International Patent Application No. PCT/IB2020/059529.

* cited by examiner

SOLAR POWER DISTRIBUTION AND CONTROL SYSTEM FOR MOVABLE STORAGE CONTAINERS

CROSS-REFERENCE TO RELATED APPLICATIONS

This application claims priority from U.S. provisional application No. 62/913,971, filed Oct. 11, 2019, the content of which is incorporated herein by reference.

FIELD

The specification relates generally to electrical supply for movable storage containers, and specifically to a solar power distribution and control system for movable storage containers.

BACKGROUND

Shipping containers may include onboard devices (e.g. refrigeration units) that require electrical power to operate. Such devices may be powered by the primary powerplant of the vehicle, e.g. in the case of semi-trailers. Power may also be provided by integrated internal combustion-based generators. However, the above solutions for powering onboard devices impose additional maintenance on the system, as well as fuel consumption and associated environmental impacts. Implementing other power generation technologies may increase the weight, complexity, cost, or a combination thereof of sufficiently to negate any advantages gained in fuel consumption.

SUMMARY

An aspect of the specification provides a movable storage container, comprising: a plurality of walls defining an enclosure for storing items; a solar power generation array affixed to an outer surface of at least one of the walls; an energy storage device configured to receive power from the solar power generation array; a switch assembly configured to: selectively receive power from a source selected from (i) the energy storage device, (ii) an auxiliary generator, and (iii) an electrical grid input, and direct the received power to a refrigeration unit; a polyphase inverter assembly connected between the energy storage device and the switch assembly; and a controller connected with the switch and configured to transmit source selection commands to the switch.

Another aspect of the specification provides a solar generation kit for a movable container, the kit comprising: a solar power generation array configured for mounting to an outer surface the movable container; an energy storage device configured to receive power from the solar power generation array; a switch assembly configured to: selectively receive power from a source selected from (i) the energy storage device, (ii) an auxiliary generator, and (iii) an electrical grid input, and direct the received power to a refrigeration unit; a polyphase inverter assembly connected between the energy storage device and the switch assembly; and a controller connected with the switch and configured to transmit source selection commands to the switch.

BRIEF DESCRIPTIONS OF THE DRAWINGS

Embodiments are described with reference to the following figures, in which.

Figure 2:
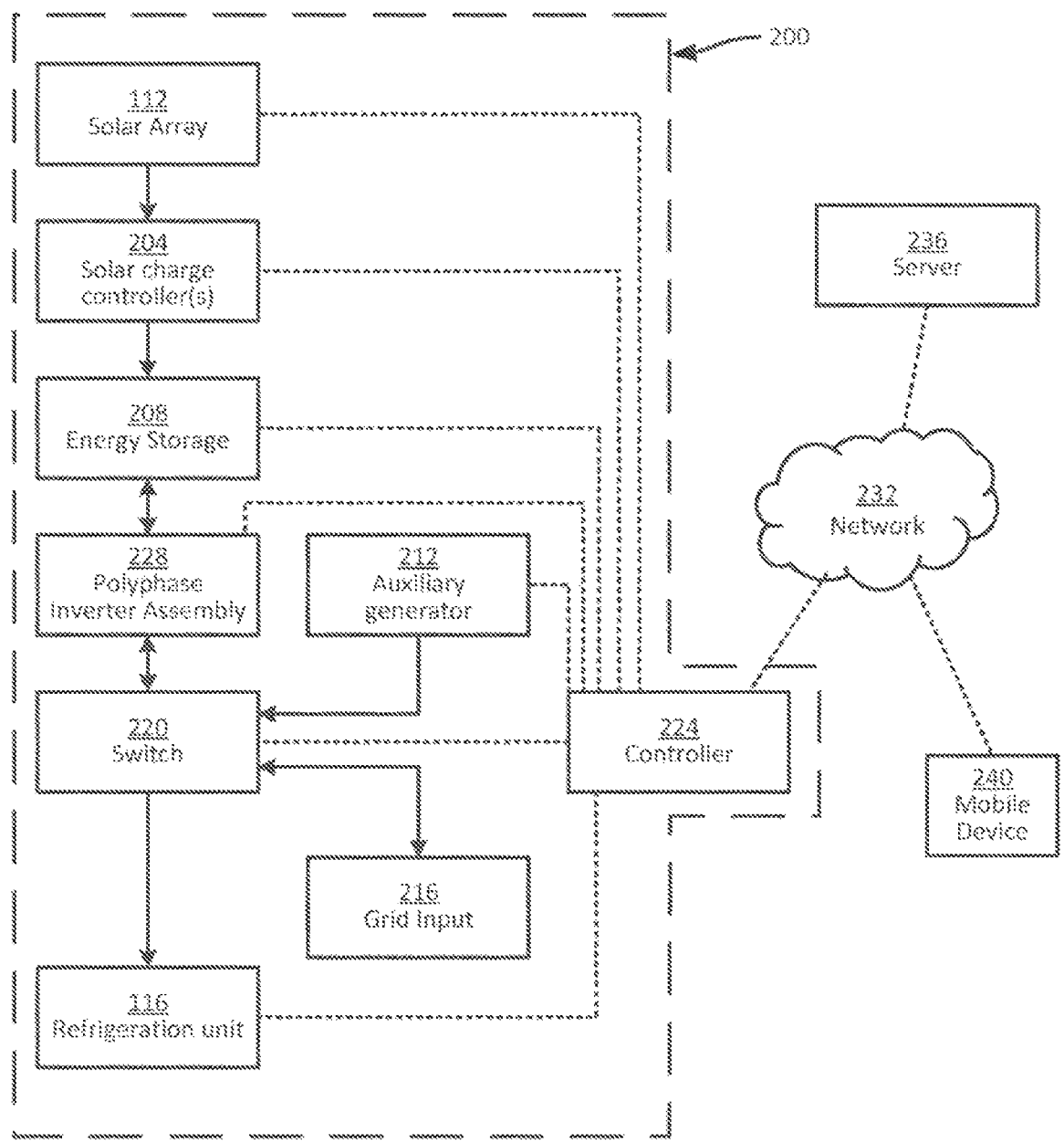
FIG. 2 is a block diagram of certain internal components of the container 100.
Figure 4:
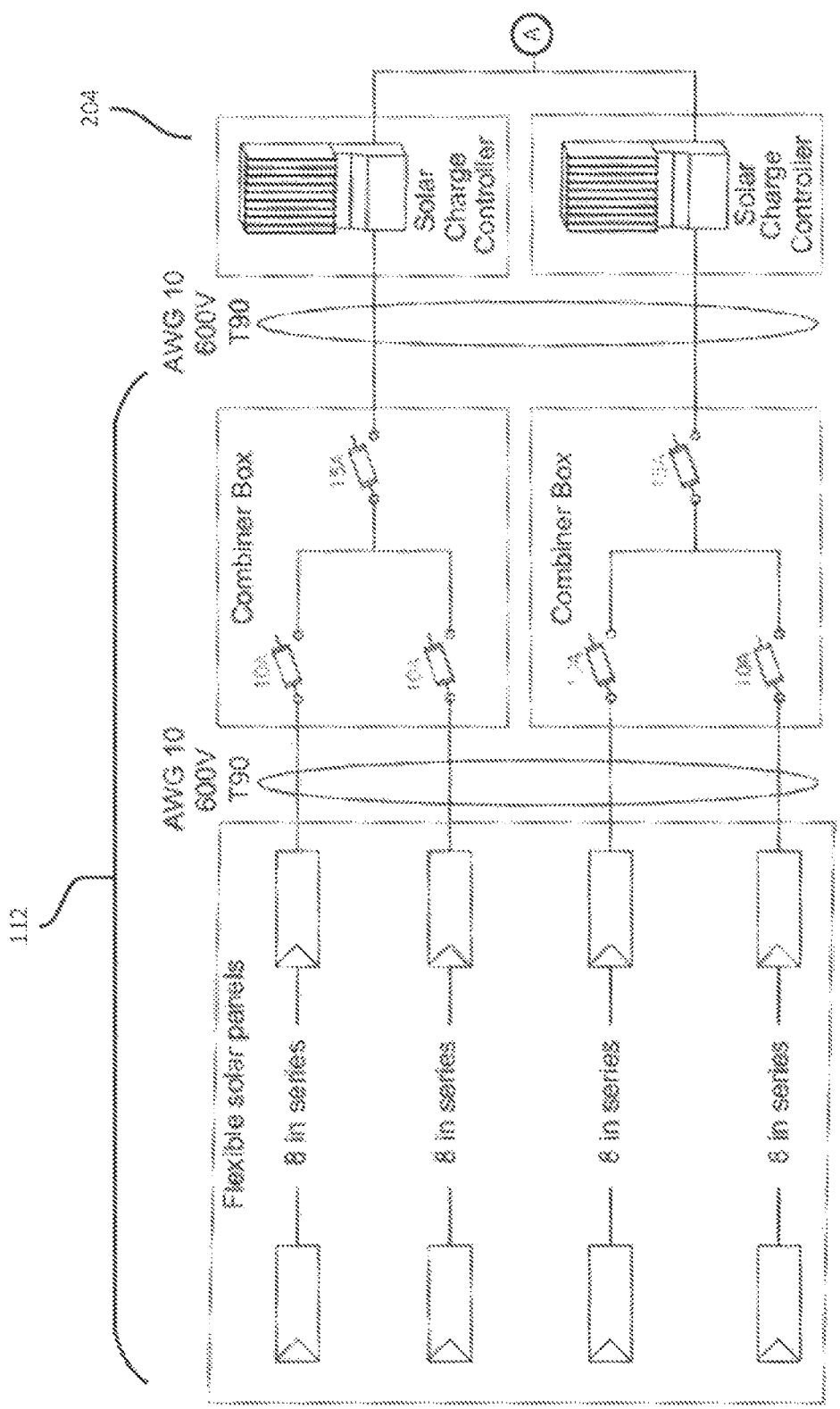
Figure 5:
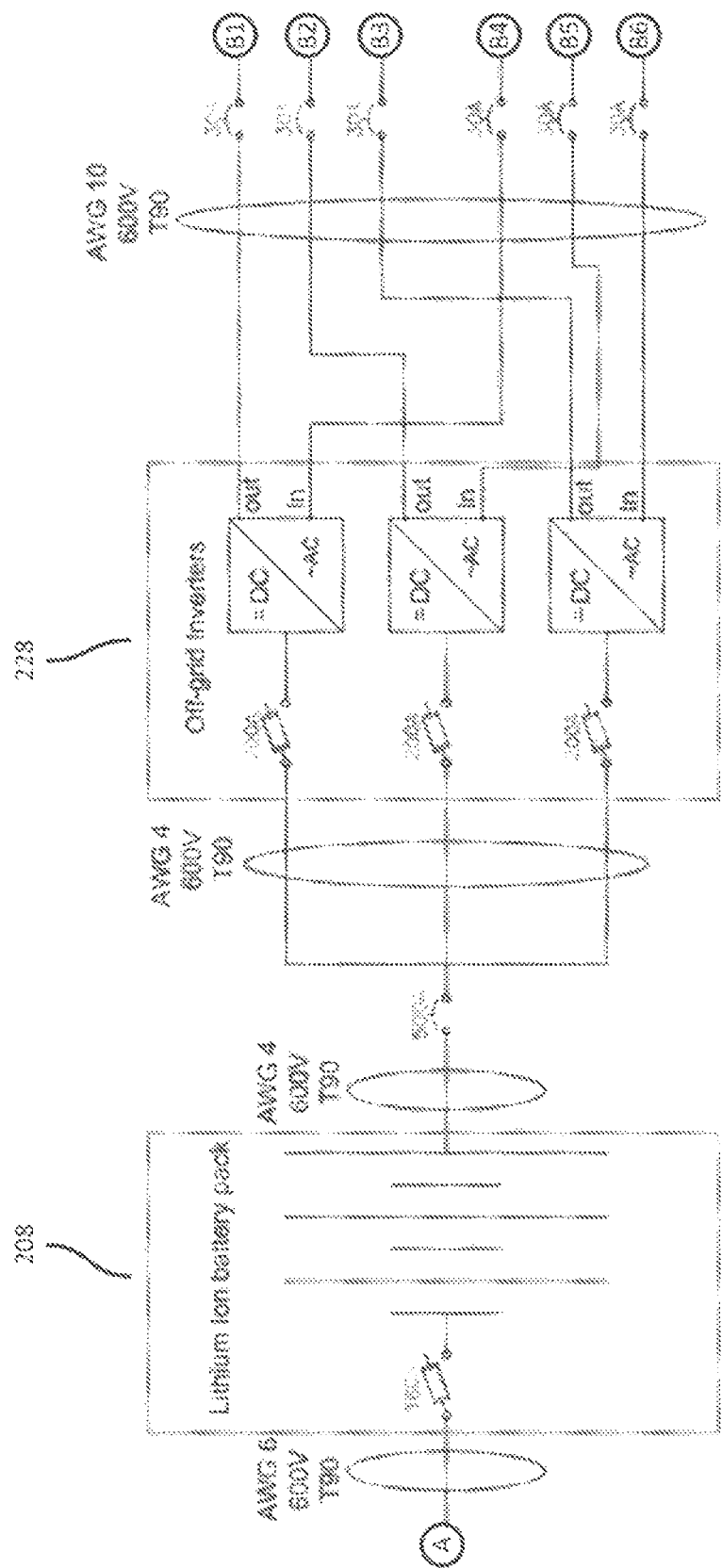
Figure 6:
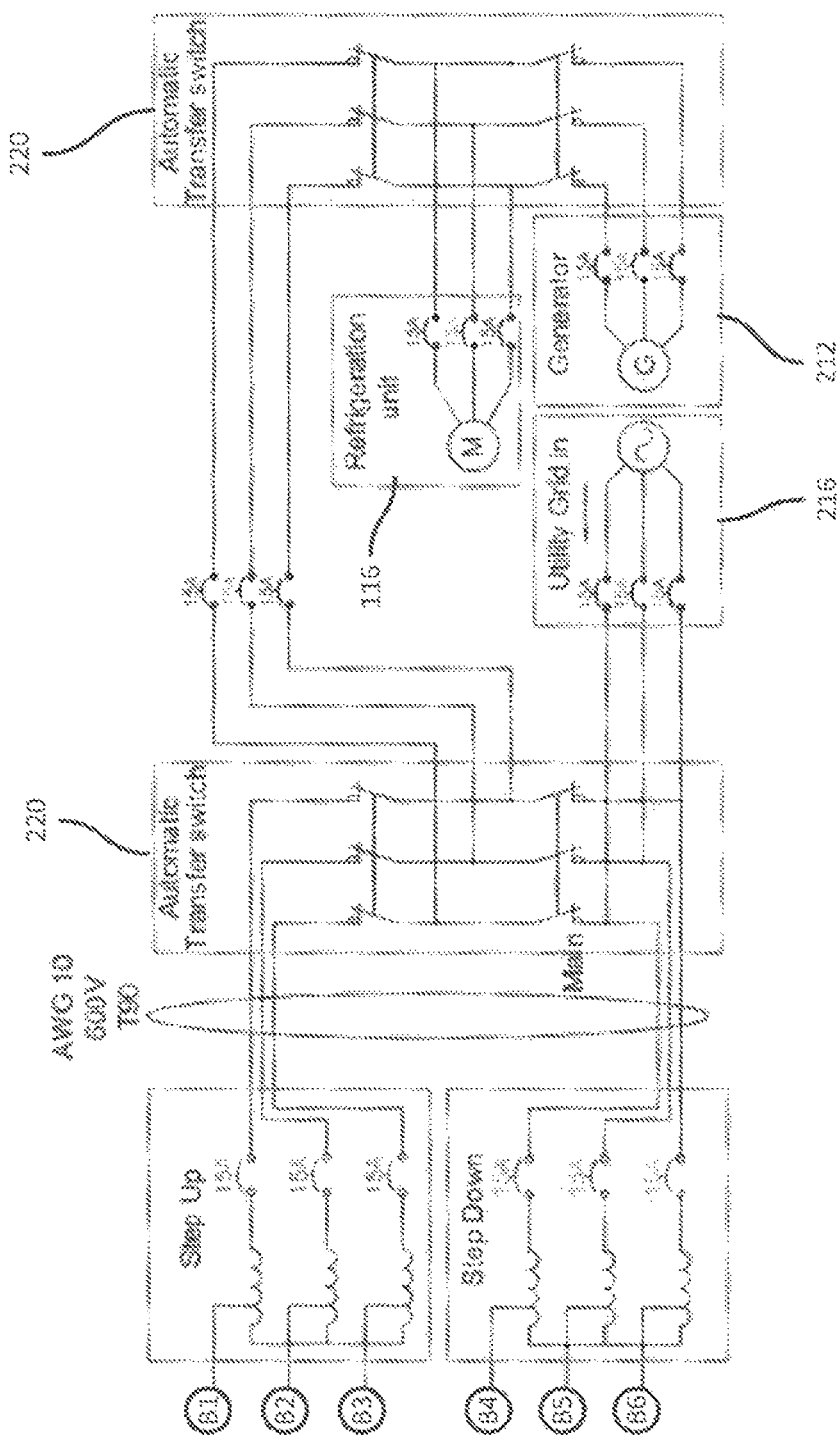
Figure 7:
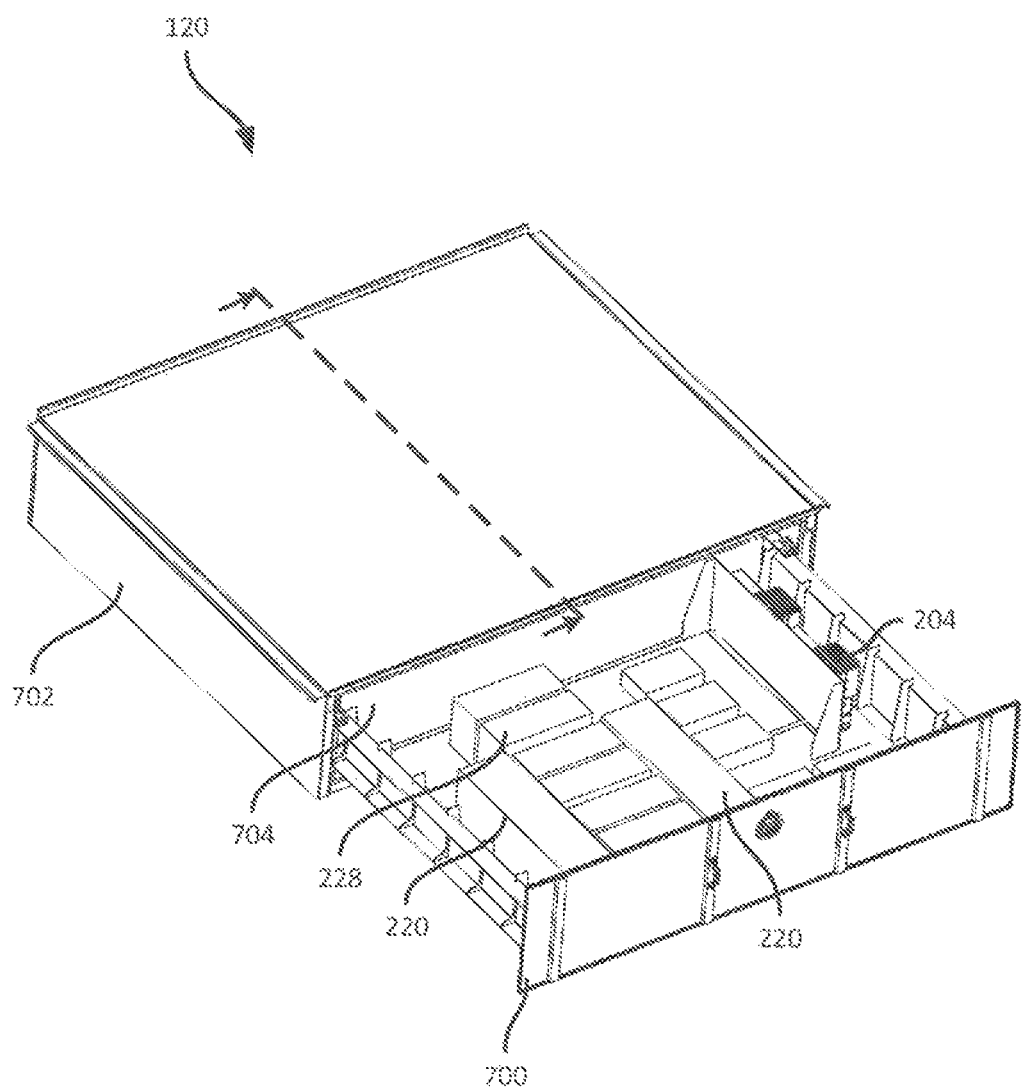

FIGS. 4, 5, and 6 are circuit diagrams illustrating an example implementation of the system of FIG. 2;

FIG. 7 is an isometric view of a platform for the system of FIG. 2; and

Figure 8:
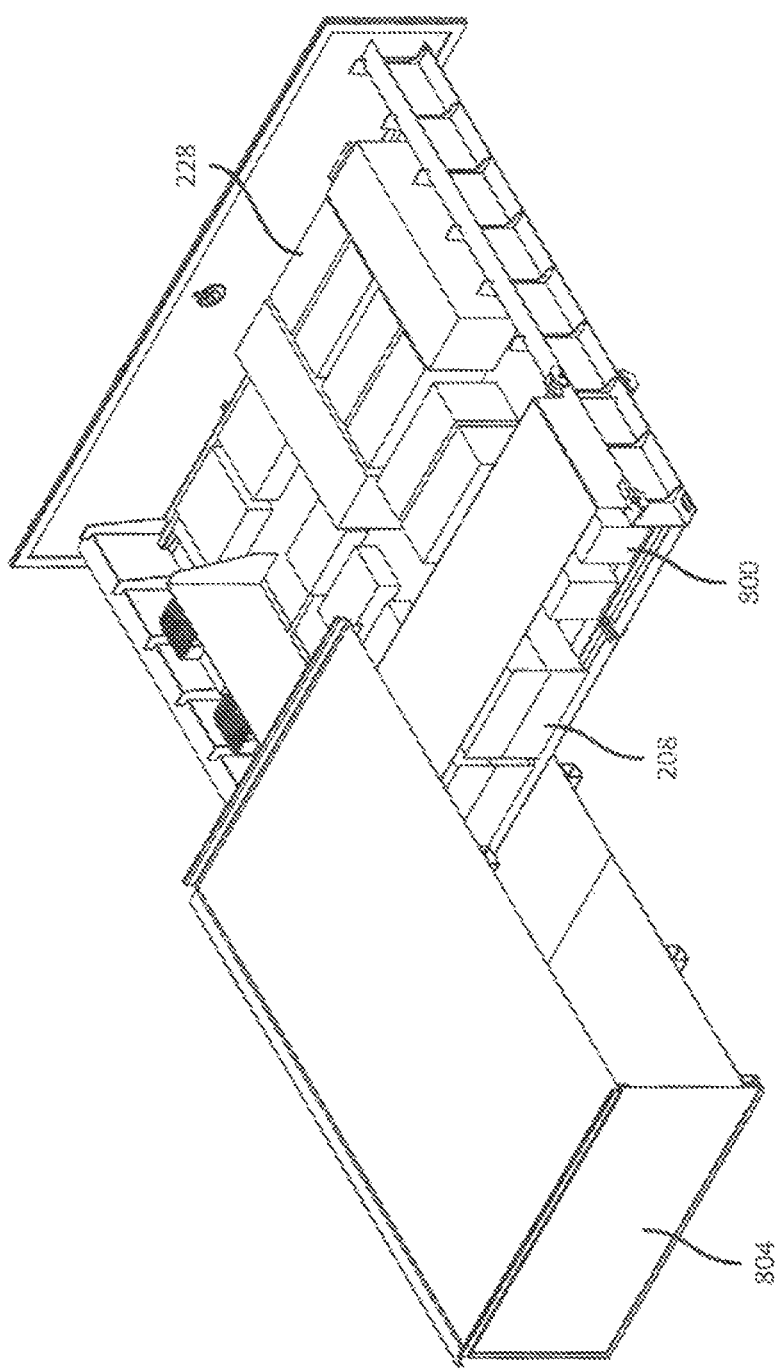

FIG. 8 is a partial cross-section of the view of FIG. 7, taken at the dashed line in FIG. 7.

DETAILED DESCRIPTION

Figure 1:
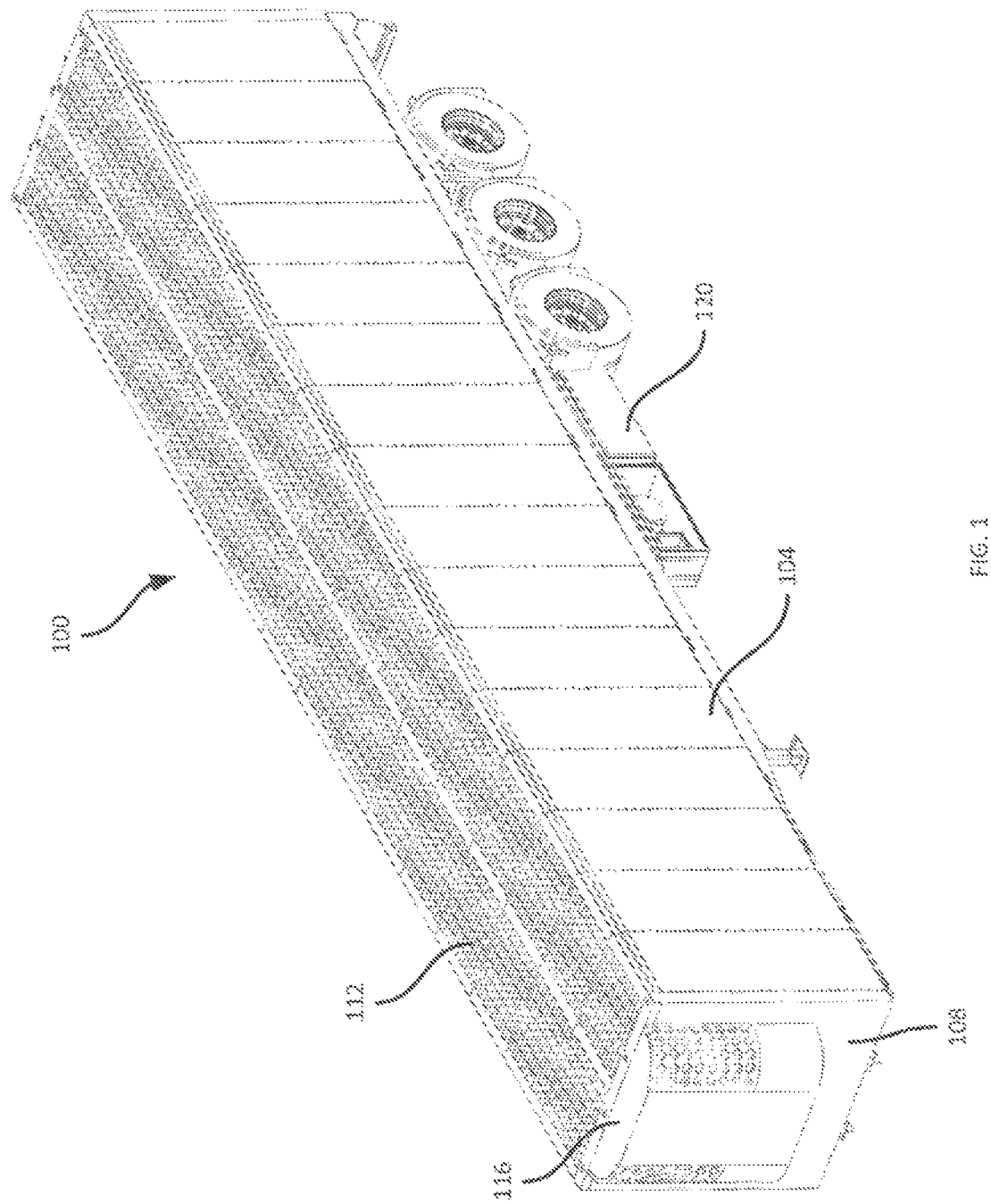
FIG. 1 depicts a movable storage container.

FIG. 1 depicts a movable storage container 100, which in the present example is a semi-trailer configured for transport when connected to a tractor unit (not shown). The storage container 100 can be implemented in various other forms in other examples. For example, the systems described herein can also be applied to shipping containers (e.g. for transport by train, ship, or the like), box truck cargo holds, and the like.

The container 100 includes a set of walls defining an enclosure for freight or other items for transport. For example, FIG. 1 illustrates a side wall 104 and a forward wall 108 of the container 100, as well as an upper wall (i.e. a roof) that supports a solar power generation array 112. The array 112 can be mounted to an upper wall of the container 100, or the array 112 can be integrated with the upper wall (i.e. the array 112 can be a structural component of the container 100)

The container 100 also includes an electrically-powered refrigeration unit 116, e.g. configured to deliver cooled air into the enclosure defined within the container 100. In other examples, the container 100 can include various other electrically-powered components, such as heaters, fans, and the like, in addition to or instead of the refrigeration unit 116. As will be apparent, ensuring consistent electrical supply to the refrigeration unit 116 may be challenging, as the container 100 may often be in transit and therefore unable to draw power from an electrical grid. As a result, refrigeration units may be powered by internal combustion engines, such as diesel generators integrated with the units themselves or otherwise carried on the container.

The array 112 of the container 100 provides an alternative source of power to the refrigeration unit 116. Deploying solar panels in a movable container such as the container 100 presents additional technical challenges, however. For example, the rate at which energy is generated by the array 112 may vary widely with the weather and other external conditions. Further, many refrigeration units in operation would require significant modifications to enable such units to accept power from a solar array such as the array 112. For example, many refrigeration units are configured to accept grid power and/or power from a generator as mentioned above. The refrigeration units may therefore be configured to accept polyphase alternating current, which solar arrays such as the array 112 may not be configured to provide.

The container 100 includes additional features, discussed below in greater detail, enabling the refrigeration unit 116 and/or other electrically powered components to be powered by the array 112 with minimal retrofitting of such components. In addition, the container 100 includes various features to enable consistent, substantially uninterrupted, power delivery to the refrigeration unit 116 under various conditions. As will be discussed below, the container 100 includes a power distribution and control system, at least a portion of which may be housed on a movable platform 120 connected to the container 100.

Turning to FIG. 2, a block diagram of a power distribution and control system 200 for the container 100 is illustrated. The system 200 is physically supported on or in the container 100, such that the system 200 moves with the container 100.

As noted in connection with FIG. 1, the system 200 includes the array 112, which may include a suitable number of solar panels. As mentioned above, the solar panels may be implemented as a structural component, e.g. forming the roof of the container 100. Examples of structural features for the array 112 are described in Applicant's PCT published patent application no. WO 2019/102419, the content of which is incorporated herein by reference. In some examples, e.g. for a semi-trailer with a length of about 50 feet, the array 112 may include a set of thirty-two solar panels, each with a peak output of about 210 W, for a total output of about 6.7 kW for the array 112 as a whole. The array 112 may include one or more combiner boxes, depending on the arrangement of the panels. For example, the above-mentioned thirty-two panels may be arranged in four strings of eight panels each, and connected to two two-string combiner boxes.

The array 112 is connected to at least one suitable solar charge controller 204. For example, more than one solar charge controller may be provided depending on the rated input capacity of the controller(s), as well as the rated output of the controller(s). For example, for the above-mentioned 6.7 kW solar array, a pair of solar charge controllers 204 may be provided each with a rated capacity of about 3.2 kW.

The solar charge controllers 204 are connected, in turn, to an energy storage device 208 such as a rechargeable battery or a set of rechargeable batteries. The chemistry (e.g. lithium ion) and capacity of the batteries may be selected based on the operational demands of the container 100 (e.g. on the power requirements of the refrigeration unit 116, the weight of the batteries, and the like). For example, the energy storage device 208 can include a set of batteries with a total storage capacity of about 20 kWh.

As will be apparent, the array 112, via the controller(s) 204 and the energy storage device 208, may supply electrical power to the refrigeration unit 116 and/or other powered devices of the container 100. The energy storage device 208 can ensure consistent power delivery to the refrigeration unit 116 under various external conditions (e.g. cloud cover and the like). However, the refrigeration unit 116 may not be configured to accept direct current (DC) power. In addition, the refrigeration unit 116 may be expected to operate continuously for extended periods of time, during which the capacity of the energy storage device 208 may be exhausted if weather or other external conditions do not permit sufficient power generation by the array 112.

The system 200 therefore also includes an auxiliary generator 212, such as an internal combustion engine (e.g. a diesel generator), which may be integrated with the refrigeration unit 116. The auxiliary generator 212 may be controlled, as discussed below, to supply power to the refrigeration unit 116 in the event that the energy storage device 208 is drained, or in the event of other distribution failures from the array 112.

The system 200 also includes a grid input 216 configured to accept grid power from an external source, e.g. when the container 100 is in a storage facility or the like. The system 200, in other words, includes three distinct power sources for the refrigeration unit 116: the array 112 (via the energy storage device 208), the generator 212, and the grid input 216. While the grid input 216 does not provide a viable alternative power source when the container 100 is in motion, the auxiliary generator 212 and the array 112 may both be operated to provide power to the refrigeration unit 116 when the container 100 is in motion.

To that end, the system 200 also includes a switch assembly 220, configured to selectively deliver power to the refrigeration unit from any one of the energy storage unit 208, the generator 212, and the grid input 216. The switch 220 may also, under some conditions, deliver power to the grid input 216 (e.g. when the container 100 is connected to the grid, and the array 112 is producing excess power beyond that required to keep the energy storage device 208 charged and power the refrigeration unit 116, if necessary).

The system 200 further includes a controller 224 connected to some or all of the above components (as shown in dashed lines in FIG. 2). The controller 224 is configured to monitor at least the charge level of the energy storage device 208, and the fault status of the distribution network. Based on the monitored parameters, the controller 224 is configured to select a power source (e.g. from the energy storage device 208 and the generator 212, and optionally the grid input 216), and to control the switch 220 to direct power from the selected source to the refrigeration unit 116. In some examples, the controller 224 can also monitor one or more environmental sensors mounted within the container 100, and initiate or cease operation of the refrigeration unit, e.g. to maintain a target temperature within the container 100.

As noted above, the refrigeration unit 116 may not be configured to accept DC power from the energy storage device 208. The system 200 therefore also includes a polyphase inverter assembly 228, configured to convert DC power from the energy storage device 208 into AC power, e.g. three-phase power, for delivery to the refrigeration unit 116. In other words, both the solar-based and generator-based power delivery mechanisms of the system 200 (as well as the grid input 216) deliver the same three-phase power to the refrigeration unit, such that the refrigeration unit 116 need not be retrofitted or otherwise modified to accept power from the multiple sources of the system 200. Instead, the use of the inverter assembly 228, the switch 220 and the controller 224 renders the source and delivery of electrical power transparent to the refrigeration unit 116.

The system 200 can include a variety of other devices not shown in FIG. 2. For example, in addition to the environmental sensors mentioned above, which can include any one or more of a temperature sensor, a humidity sensor, a pressure sensor, and the like, the system 200 can include one or more safety devices. For example, the system 200 can include at least one of a ground fault detector, and an arc fault detector. The system 200 can further include monitoring sensors for the components shown in FIG. 2, such as temperature sensors in the energy storage device 208 and the like.

In some examples, the controller 224 is also configured to communicate with one or more computing devices via a network 232, which may include any suitable combination of local and wide-area networks. The controller 224 may therefore include a communications interface, such as a wireless transceiver or the like. The controller 224 can, in particular, communicate with either or both of a server 236 and a mobile computing device 240 via the network 232. The controller 224 can collect and provide data from the above-mentioned sensors to the server 236, for storage at the server 236 or at another associated computing device. Data collected by the controller 224 for provision to the server 236 (e.g. for storage, analysis, reporting and the like) can further include status information for any combination of the storage device 208, controllers 204, array 112, inverter assembly 228, switch assembly 220, generator 212, grid input 216, and refrigeration unit 116.

The controller 224 can also be configured to receive data from the server 236, such as route planning information (e.g. if the container 100 is a semi-trailer), weather data, and the like. The mobile device 240 may be operated by a driver, and may also communicate with the controller 224 to retrieve the above-mentioned sensor data, as well as operational information such as a current charge level of the storage device 208, the currently active power source for the refrigeration unit 116, and the like. Furthermore, the controller 224 can obtain the trailer's location (e.g. via GPS) as well as local weather and use such information to modify internal temperature control by enabling or disabling the refrigeration unit 116.

Figure 3:
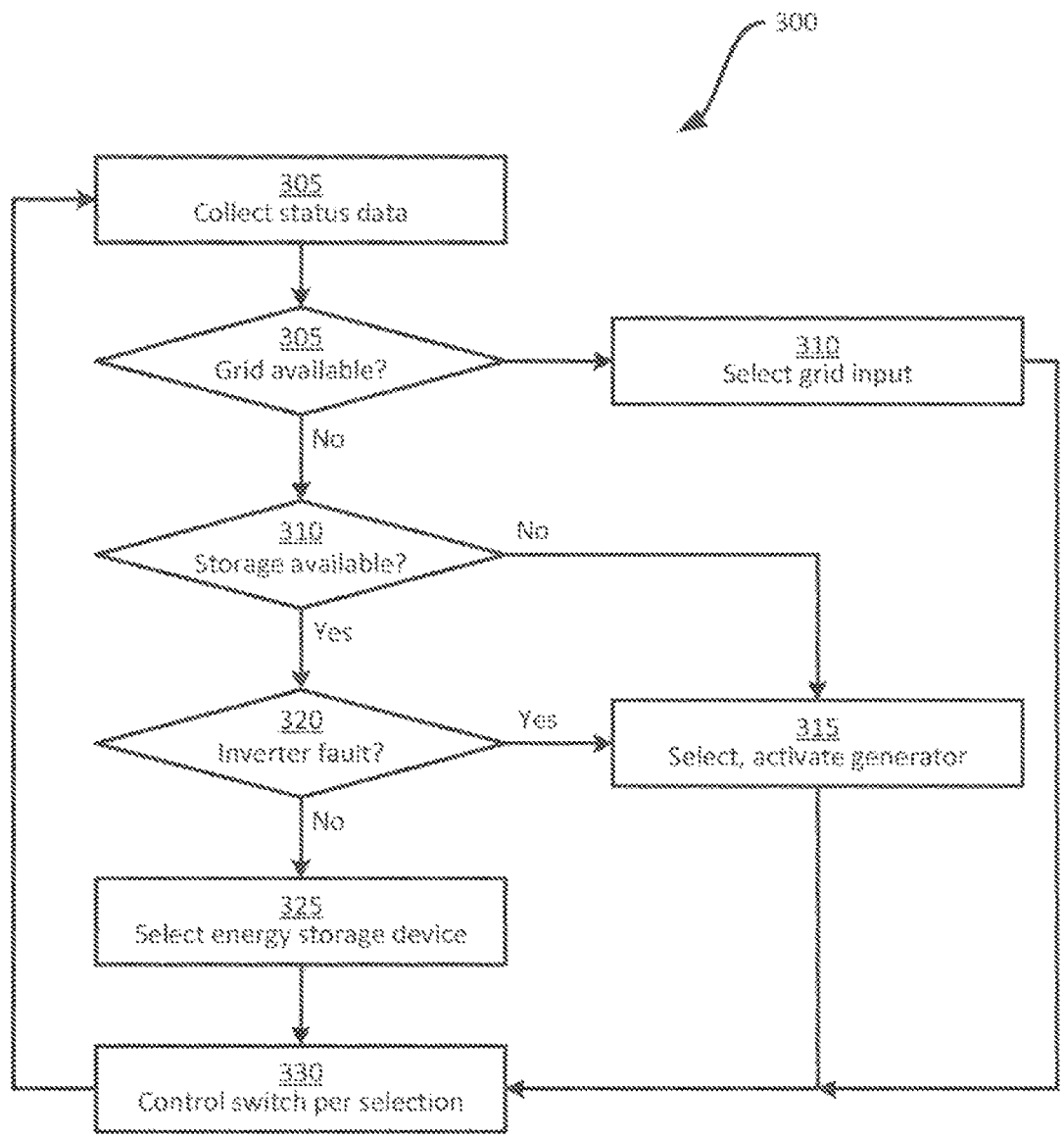
FIG. 3 is a flowchart of a control method for the internal components of FIG. 2.

Turning to FIG. 3, certain aspects of the functionality of the controller 224 are shown, in the form of a method 300 of selecting a power source for the refrigeration unit 116. At block 305, the controller 224 collects status data from other components of the system 200. The status data includes, for example, the charge level of the storage device 208, the output of the array 112, the status of the inverter assembly 228, and the like.

At block 305, the controller 224 determines whether grid power is available via the grid input 216. When the determination at block 305 is affirmative, the controller 224 selects the grid input 216 as the active power source for the refrigeration unit 116.

If no grid power is present, at block 310 the controller 224 determines whether the storage device 208 has sufficient charge to supply the refrigeration unit 116. The determination at block 310 can include checking whether the charge level of the storage device 208 exceeds a threshold and/or whether the array 112 is producing a threshold amount of power. For example, if the charge level of the storage device 208 is below the threshold, the determination may nevertheless be affirmative if the output of the array 112 is sufficient to power the refrigeration unit 116 without further draining the storage device 208.

When the determination at block 310 is negative, the controller 224 selects the generator 212 as the active power source for the refrigeration unit 116, and activates the generator 212 at block 315. When the determination at block 310 is affirmative, prior to selecting the storage device 208 and/or array 112 as the active power source, the controller 224 determines, at block 320, whether the inverter 228 has experienced a fault. The inverter 228 may be sensitive to impacts (e.g. bumps from travel along a road), which may cause the inverter 228 to reset and become unavailable briefly. Thus, even if the storage device 208 is able to support operation of the refrigeration unit 116, the controller 224 may select the generator 212, if the inverter 228 is briefly offline.

When the determination at block 320 is negative, the controller 224 selects the storage device 208 as the power source for the refrigeration unit 116. At block 330, the controller 224 sends a command to the switch assembly 220 to direct power from the selected source to the refrigeration unit 116. The method 300 is repeated continuously, and thus the controller 224 returns to block 305 after controlling the switch 220.

FIGS. 4, 5, and 6 illustrate an example arrangement of a system 200. As will be apparent to those skilled in the art, the specifications below may vary depending on the application (e.g. the size and nature of deployment of the container, the required output of the refrigerator, and the like).

In particular, as shown in FIG. 4, the array 112 includes thirty-two 210 W flexible solar panels, arranged in four strings of eight modules per string. The panels are rated, in this example, to a voltage of 365V, and a current of 4.6 A per string. The rated power output of the array 112 in this example is thus about 1.68 kW per string, or about 6.7 kW total. The array 112 includes a pair of combiner boxes, e.g. rated to 1000V, 10A input and 15A output, for a rated power of 10 kW. The solar charge controllers 204, in this example, include two controllers rated for 100-525V and a maximum of 15A input. and 48V with a maximum 60A output, for a rated power of 3.2 kW per controller.

FIG. 5 illustrates examples of the storage device 208, and the inverters 228. The inverters 228 include three single-phase 460V inverters that are stacked and synchronized with each other to provide a three phase 208V output. As shown in FIG. 6, a pair of transformers are coupled to the inverters 228, to either step up from 3-phase. 208V to 480V. or step down from 480V to 208V. As shown in FIG. 6, the inverters 228, the generator 212, and the grid input 216 are connected to the switch assembly 220 (which may be deployed as two separate sets of switches as illustrated).

The container 100 also includes structural features to facilitate maintenance of the system 200, as well as safeguard the system 200 against tampering and environmental impacts. For example, as seen in FIG. 1, the system 200 is supported within a platform 120 that is movably mounted to the container 100. The platform 120 is shown in isolation in FIG. 7.

The platform 120, in the present example, includes a drawer 700 slidably mounted to the container 100 (e.g. encased in a housing 702 below the floor of the container 100). The drawer 700 is shown in an open position in FIG. 7, exposing a first portion of the drawer 700 to the exterior of the container 100. The first portion includes the inverters 228, the switches 220, the charge controllers 204, and the above-mentioned safety switches (e.g. ground and arc fault detectors).

The first portion visible in FIG. 7 is separated from a second portion of the drawer by a partition 704. The second portion is visible in FIG. 8, in which the housing 702 is cross-sectioned to reveal the storage device 208 and, in this example, transformers 800. The storage device 208 and transformers 800 therefore are not accessed by opening the drawer 700 as shown in FIG. 7, but rather by closing the drawer 700 and removing or otherwise opening an access panel on an opposite side of the housing 702. The housing 702 may have the same width as the container 100, such that the panel 804 is contiguous with a side wall of the container 100.

The scope of the claims should not be limited by the embodiments set forth in the above examples, but should be given the broadest interpretation consistent with the description as a whole.

The invention claimed is:

1. A movable storage container, comprising:
a plurality of walls defining an enclosure for storing items;
a solar power generation array affixed to an outer surface of at least one of the walls;
an energy storage device configured to receive power from the solar power generation array;

an access panel, wherein the access panel is removable to expose the energy storage device to an exterior of the container;
a switch assembly configured to:
selectively receive power from a source selected from (i) the energy storage device, (ii) an auxiliary generator, and (iii) an electrical grid input, and
direct the received power to a refrigeration unit;
a polyphase inverter assembly connected between the energy storage device and the switch assembly; and
a controller connected with the switch and configured to transmit source selection commands to the switch;
a platform supporting the energy storage device, the switch assembly, and the polyphase inverter assembly, the platform movably coupled to a first of the walls to enclose the energy storage device, the switch assembly, and the polyphase inverter assembly between the platform and the first wall when the platform is in a closed position;
wherein the platform includes a drawer slidable between the closed position and an open position, the drawer including:
an outer portion supporting the switch assembly and the polyphase inverter, wherein the outer portion is exposed to an exterior of the container when the drawer is in an open position; and
an inner portion supporting the energy storage device, wherein the inner portion remains enclosed between the drawer and the first wall when the drawer is in the open position.

2. The movable storage container of claim 1, further comprising:
the refrigeration unit, supported by at least one of the walls and configured to deliver cooled air to the enclosure.

3. The movable storage container of claim 2, wherein the refrigeration unit contains the auxiliary generator.

4. The movable storage container of claim 3, wherein the auxiliary generator includes an internal combustion engine.

5. The movable storage container of claim 1, wherein the energy storage device includes a battery.

6. The movable storage container of claim 1, wherein the solar power generation array is integrated with the at least one of the walls.

7. The movable storage container of claim 1, wherein polyphase inverter assembly is configured to supply three-phase power to the refrigeration unit via the switch.

8. The movable storage container of claim 7, wherein the polyphase inverter assembly includes a set of single-phase inverters.

9. The movable storage container of claim 1, wherein the controller is configured to:
obtain a set of inputs including:
an output level of the solar power generation array;
a charge level of the energy storage device;
a status of the polyphase inverter assembly;
an activity status of the electrical grid input;
based on the set of inputs, select a source from (i) the energy storage device, (ii) the auxiliary generator, and (iii) the electrical grid input; and
send a command to the switch assembly to direct power from the selected source to the refrigeration unit.

* * * * *